(12) United States Patent
Webster et al.

(10) Patent No.: US 10,917,693 B2
(45) Date of Patent: Feb. 9, 2021

(54) SYSTEMS AND METHODS FOR UTILIZING TONES

(71) Applicant: Nicholas-Alexander, LLC, Las Vegas, NV (US)

(72) Inventors: Thomas Webster, Las Vegas, NV (US); James Blommel, Dayton, OH (US); James Salzarulo, Covington, KY (US)

(73) Assignee: Nicholas-Alexander, LLC, Las Vegas, NV (US)

(*) Notice: Subject to any disclaimer, the term of this patent is extended or adjusted under 35 U.S.C. 154(b) by 68 days.

(21) Appl. No.: 16/426,349

(22) Filed: May 30, 2019

(65) Prior Publication Data

US 2019/0281354 A1    Sep. 12, 2019

Related U.S. Application Data

(63) Continuation-in-part of application No. 14/880,709, filed on Oct. 12, 2015.
(Continued)

(51) Int. Cl.
*G06Q 30/00* (2012.01)
*H04N 21/4627* (2011.01)
(Continued)

(52) U.S. Cl.
CPC ..... *H04N 21/4627* (2013.01); *G06Q 30/0185* (2013.01); *H04N 21/435* (2013.01); *H04N 21/439* (2013.01); *H04N 21/4524* (2013.01)

(58) Field of Classification Search
CPC ............. G06Q 30/0185; G06Q 30/185; G06Q 30/241; H04N 21/4627; H04N 21/4524
See application file for complete search history.

(56) References Cited

U.S. PATENT DOCUMENTS 7,243,362 B2    7/2007  Swix et al.
7,853,124 B2 *  12/2010  Ramaswamy ..... H04N 21/4347
                                              386/239
(Continued)

OTHER PUBLICATIONS

Klein, Gary. Streetlights and shadows: searching for the keys to adaptive decision making (MIT Press 2009, pp. 33-47).
(Continued)

*Primary Examiner* — Waseem Ashraf
*Assistant Examiner* — Michael I Ezewoko
(74) *Attorney, Agent, or Firm* — Dinsmore & Shohl LLP

(57) ABSTRACT

A method of utilizing tones includes receiving content including at least an audio portion for broadcast to a first plurality of users having a first recipient computing device and a second plurality of users having a second recipient computing device, receiving data comprising a first and a second message, determining one or more locations within the content for embedding the first and second messages, converting at least the first and second messages into a plurality of tones that cannot be directly detected by the first and second pluralities of users during broadcast, incorporating the plurality of tones into the content at the one or more locations, and providing the content with the plurality of tones for broadcast via a presentation device such that the plurality of tones are detected by the first and second recipient devices for determining at least one of the first and second messages.

17 Claims, 9 Drawing Sheets

Related U.S. Application Data

(60) Provisional application No. 62/062,421, filed on Oct. 10, 2014.

(51) Int. Cl.
  *H04N 21/45* (2011.01)
  *H04N 21/435* (2011.01)
  *H04N 21/439* (2011.01)

(56) References Cited

U.S. PATENT DOCUMENTS

| | | | |
|---|---|---|---|
| 7,930,714 | B2 | 4/2011 | Konig et al. |
| 9,264,151 | B1 | 2/2016 | Emigh et al. |
| 9,401,153 | B2 | 7/2016 | Sharma et al. |
| 9,712,474 | B2 | 7/2017 | Xie et al. |
| 9,886,696 | B2 * | 2/2018 | Roeding ............ G06Q 30/0214 |
| 2012/0197648 | A1 * | 8/2012 | Moloney ............... G10L 19/018 |
| | | | 704/500 |
| 2013/0204413 | A1 | 8/2013 | Gehani |

OTHER PUBLICATIONS

Zittrain, Jonathan L. The Future of the Internet—and How to Stop It (Yale University Press & Penguin UK 2008, pp. 11-18).

Office Action dated Dec. 29, 2017 in related U.S. Appl. No. 14/880,709.

Wirth, Niklaus. Algorithms + data structures = programs (Prentice-Hall, Inc. 1974, pp. xii-55).

Office action dated Apr. 27, 2018 in related U.S. Appl. No. 14/880,709.

Advisory Action dated Jul. 12, 2018 in related U.S. Appl. No. 14/880,709.

Proulx, Mike. Social How marketers can reach and engage audiences by connecting television to the web, social media, and mobile (John Wiley & Sons 2012, pp. 57-80).

Office action dated Sep. 25, 2018 in related U.S. Appl. No. 14/880,709.

Office action dated Apr. 11, 2019 in related U.S. Appl. No. 14/880,709.

\* cited by examiner

FIG 3A
CLIENT LOGIN
PASSWORD

FIG 3B
WELCOME (NAME)
WOULD YOU LIKE TO:
- GO TO DOWNLOADS
- LOGOUT
- OPEN PREVIOUS PROJECT
- START NEW PROJECT

FIG 3C
START NEW PROJECT
PROJECT TITLE:
PROJECT NUMBER: (AUTO GENERATED) SAM-R-13130
UPLOAD MEDIA: [BROWSE] [BACK]
[ENTER]

FIG 3D
TONE LOCATIONS
[AUTO] [MANUAL]
TONE
0 5 10 15 20 25 30
ADD SECOND TONE? YES ☒ NO ☐
TONE 2 (ONLY IF YES BOX IS SELECTED)
0 5 10 15 20 25 30
[DONE] [BACK]

FIG 3E
ASSOCIATED MESSAGE
TONE 1 [FILE NAME] [BROWSE]
ACTION
☒ SEND OFFER IMMEDIATELY
☐ SEND OFFER AFTER 5 HITS
☐ STORE INFO IN DATABASE
ACTIVE DATES:
START __/__/__
END __/__/__
(TONE 2 SAME AS ABOVE)
[DONE] [BACK]

FIG 3F
PROCESSING MEDIA FILE
0%  75%  100%

FIG 3G
DOWNLOADS PAGE

| PROJECT# | DATE | TITLE | ISCI CODE |
|---|---|---|---|
| 0004133 | 01-01-18 | PAMPERS 1 | DBS50T01 |

[SAVE AS]
[RETURN TO MAIN]
[LOG OUT]

FIG 3H
OPEN/REVISE PREVIOUS
SELECT ONE:

| PROJECT# | DATE | TITLE | ISCI CODE |
|---|---|---|---|
| 0004133 | 01-01-18 | PAMPERS 1 | DBS50T01 |
| 0012213 | 03-12-18 | CREST 1 | CRS32T01 |
| 0012729 | 03-14-18 | CREST 2 | CRS33T02 |
| 0012999 | 02-25-18 | PAMPERS 2 | DBS5IT02 |

[ENTER] [BACK]

FIG. 7A
CLIENT LOGIN
PASSWORD

FIG. 7B
WELCOME (NAME)
WOULD YOU LIKE TO:
GO TO DOWNLOADS | LOGOUT
OPEN PREVIOUS PROJECT | START NEW PROJECT

FIG. 7C
START NEW PROJECT
PROJECT TITLE:
PROJECT NUMBER: (AUTO GENERATED) SAM-R-13130
UPLOAD MEDIA: BROWSE
ENTER | BACK

FIG. 7D
TONE LOCATIONS
AUTO | MANUAL
TONE
ADD SECOND TONE? YES ☒ NO ☐
TONE 2 (ONLY IF YES BOX IS SELECTED)
DONE | BACK

FIG. 7E
ASSOCIATED MESSAGE
TONE 1 | FILE NAME | BROWSE
ACTION
☒ DETERMINE PROJECTOR LOCATION
☐ DETERMINE OWNER OF CONTENT
☐ STORE INFO IN DATABASE
ACTIVE DATES:
START __/__/__
END __/__/__
(TONE 2 SAME AS ABOVE)
DONE | BACK

FIG. 7F
PROCESSING MEDIA FILE
0%  75%  100%

FIG. 7G
DOWNLOADS PAGE

| PROJECT# | DATE | TITLE | ISCI CODE |
|---|---|---|---|
| 0004133 | 01-01-18 | MOVIE 1 | DBS50T01 |

SAVE AS
RETURN TO MAIN
LOG OUT

FIG. 7H
OPEN/REVISE PREVIOUS
SELECT ONE:

| PROJECT# | DATE | TITLE | ISCI CODE |
|---|---|---|---|
| 0004133 | 01-01-18 | MOVIE 1 | DBS50T01 |
| 0012213 | 03-12-18 | COMM 1 | CRS32T01 |
| 0012729 | 03-14-18 | COMM 2 | CRS33T02 |
| 0012999 | 02-25-18 | MOVIE 2 | DBS51T02 |

ENTER | BACK

SYSTEMS AND METHODS FOR UTILIZING TONES

CROSS REFERENCE

This application is a continuation in part of U.S. patent application Ser. No. 14/880,709 filed Oct. 12, 2015 which claims priority to U.S. Provisional Application Ser. No. 62/062,421, filed Oct. 10, 2014, both of which are incorporated by reference in their entireties.

TECHNICAL FIELD

Embodiments provided herein generally relate systems and methods for utilizing tones, and particularly to utilizing tones within broadcast content for anti-piracy monitoring as well as engaging with consumers.

BACKGROUND

Piracy is the biggest threat to the movie industry and a cause of substantial revenue loss to the motion picture industry. Piracy is often facilitated by unconsented recording of a movie broadcast in a theater using video cameras and camcorders. With improving imaging quality of video cameras and camcorders, the threat of piracy becomes even more menacing to motion picture providers as the image quality of the copied recording is virtually indistinguishable from the original recording. As a result, motion picture providers are continually looking for foolproof ways to detect the source of piracy for the broadcasted movie or other copyrighted content.

At the same time, while many advertisers and motion picture providers wish to reach consumers in a plurality of different media, oftentimes commercials become invasive to the consumer's experience of engaging with the broadcasted movie or copyrighted content. As an example, if a consumer watches a movie on a website, he/she is often bombarded with banner advertisements, popup advertisements, etc. Accordingly, advertisers and motion picture providers are searching for new ways to reach consumers without degrading the consumer experience of engaging with the broadcasted movie or copyrighted content.

Thus, it would be beneficial to advertisers and motion picture providers to achieve both objectives of authenticating content as well as deliver commercials to consumers in ways that are non-invasive to the consumer's experience.

SUMMARY

Embodiments disclosed herein generally relate to systems and methods for utilizing tones within broadcast content for anti-piracy monitoring as well as engaging with consumers. In one embodiment, a method of utilizing tones includes receiving content including at least an audio portion, wherein the content is configured for broadcast via a presentation device to a first plurality of users having a first recipient computing device and a second plurality of users having a second recipient computing device. The method includes receiving data comprising a first message and a second message, wherein the first message is different from the second message and determining one or more locations within the content for embedding the first message and the second message. The method further includes converting at least the first message and the second message into a plurality of tones that cannot be directly detected by the first plurality of users and the second plurality of users during broadcast, incorporating the plurality of tones into the content at the one or more locations and providing the content with the plurality of tones for broadcast via the presentation device such that the plurality of tones are detected by the first recipient computing device and the second recipient device for determining at least one of the first message and the second message.

In another embodiment, a system of utilizing tones includes a presentation device for broadcasting content and a computing device communicatively coupled to the presentation device. The computing device includes a first processor and a first non-transitory computer-readable medium that stores logic that, when executed by the first processor, causes the system to perform at least a number of steps. These steps include receiving content including a presentation with an audio portion and a video portion, wherein the content is configured for broadcast via the presentation device to a plurality of users having a recipient computing device and receiving data comprising a first message and a second message, wherein the first message is different from the second message. The steps also include determining one or more locations within the content for embedding the first message and the second message and converting at least the first message and the second message into a plurality of tones that cannot be directly detected by the plurality of users during broadcast. The steps further include incorporating the plurality of tones into the content at the one or more locations and providing the content with the plurality of tones for broadcast via the presentation device such that at least a portion of the plurality of tones are detected by the recipient computing device for determining at least one of the first message and the second message to authenticate ownership of the content and a location of the presentation device.

In yet another embodiment, a computing device for utilizing tones is disclosed. The computing device includes a first processor and a first non-transitory computer-readable medium that stores logic that, when executed by the first processor, causes the computing device to perform at least a number of steps. The steps include receiving content including a presentation with an audio portion and a video portion, wherein the content is configured for broadcast via a presentation device to a plurality of users having a recipient computing device and receiving data comprising a message, wherein the message includes ownership of the content and location of the presentation device. The steps also include determining a location within the content for embedding the message and converting at least a portion of the message into a plurality of tones that cannot be directly detected by the plurality of users during broadcast. The steps further include incorporating the plurality of tones into the content at the location and providing the content with the plurality of tones for broadcast via the presentation device such that the plurality of tones are detected by the recipient computing device for determining the message to authenticate ownership of the content and location of the presentation device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIGS. 3A-3H depict user interfaces of a software application for creating and/or utilizing a project of embedding tones carrying a commercial message within a content, according to one or more embodiments described herein;

FIGS. 7A-7H depict user interfaces of a software application for creating and/or utilizing a project of embedding tones carrying an anti-piracy monitoring message within content, according to one or more embodiments shown and described herein;

DETAILED DESCRIPTION

Figure 1:
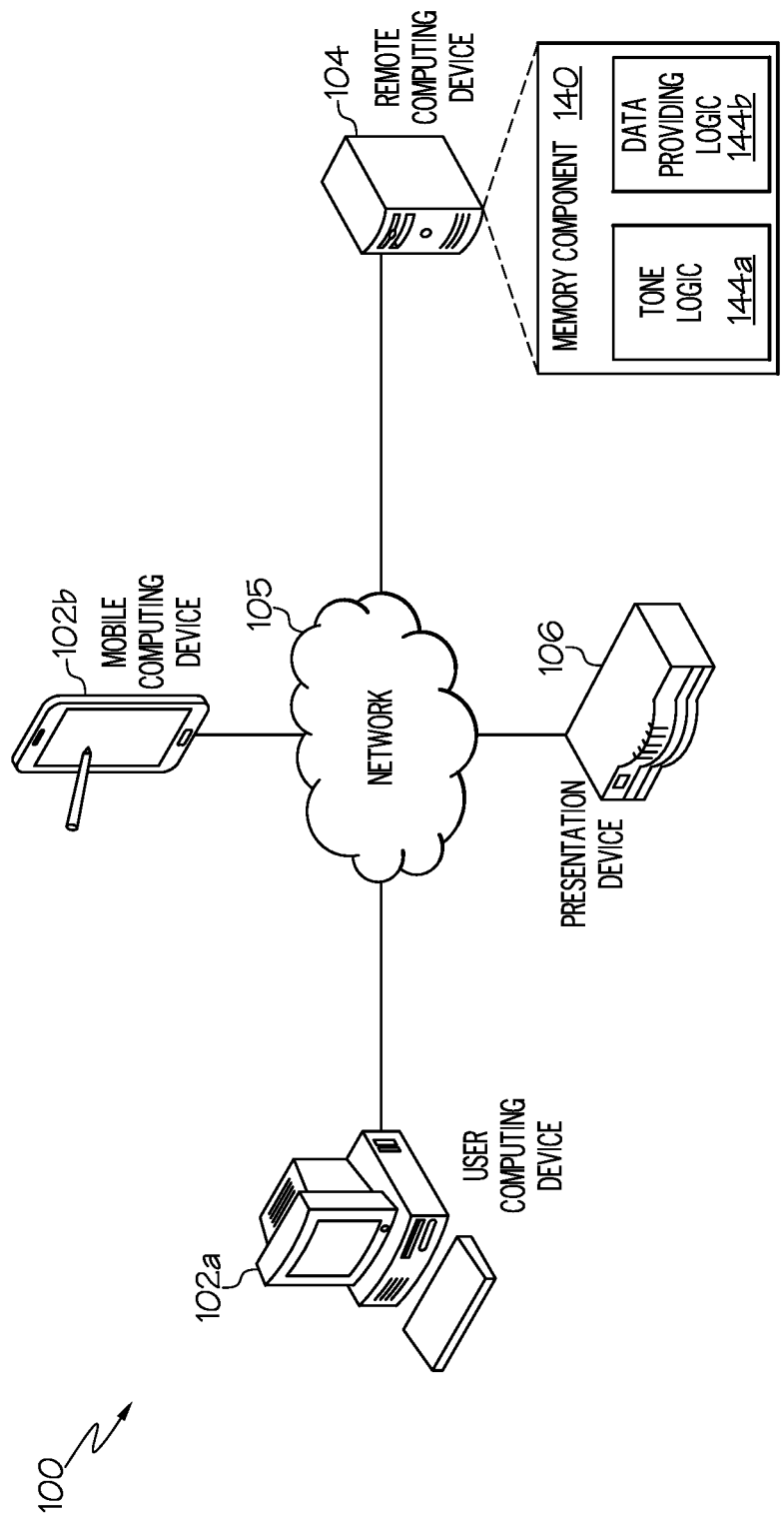
FIG. 1 depicts a first embodiment of a computing environment of a system of utilizing tones, according to one or more embodiments shown and described herein.

Embodiments disclosed herein relate to systems and methods for utilizing tones within broadcast content for anti-piracy monitoring as well as engaging with consumers. While references to a "tone" or "tones" may be used herein, it should be understood that, depending on the particular embodiment, one or more tones may be created and outputted for communicating the desired data.

Some embodiments are configured to incorporate one or more inaudible tones into content, where the one or more inaudible tones are not directly detectable by a human, but can be detected by a recipient computing device (e.g. a mobile device, tablet), such that in response to detecting the one or more inaudible tones, the recipient computing device may provide tangential information to a user. Depending on the particular embodiment, the tone may be inaudible because the tone is outside of the audible frequency band for a human. In some embodiments, the tone may be inaudible because it is masked within the content with similar frequency sounds.

The tangential information may include information regarding the content, information regarding a current location of the user, information regarding a product and/or service that the user might have interest, as well as an anti-piracy monitoring message that authenticates ownership of the content and location of a presentation device that broadcasted the content. The tangential information may also include metadata associated with the delivery of the inaudible tones such as, but not limited to, time and date when the tone was delivered, the type and brand of recipient computing device where the tone was delivered, the location and weather near the recipient computing device, the software application that received the tone and the user reaction on receiving the tone.

In some embodiments, the tones have non-naturally occurring frequency ranges above 15 kHz to communicate the tangential information such that are not directly detectable by a human. Based on input regarding the information to be communicated, a remote computing device selects pairs of the non-naturally occurring frequencies and assigns and/or selects sounds corresponding to the frequency pairs a unique character. Frequency pairs may be optimized to prevent intermodulation. Characters of the information may then be arranged in a sequence to form the one or more inaudible tones. There may be trillions of sequences available, which ensures uniqueness of each inaudible tone. The information is then encoded as at least one inaudible tone and delivered to the recipient computing device. The recipient computing device may include hardware and/or software for detecting the inaudible tones and decoding the information contained in at least one tone.

In some example embodiments, the inaudible tones may include one or more frequencies to communicate data. Table 1, below depicts an example pattern for communicating data, such as 0-9 and A-F. A parity bit is also used in Table 1.

TABLE 1

| Data | Pattern |
|------|---------|
| 0 | 1 0000 |
| 1 | 0 0001 |
| 2 | 0 0010 |
| 3 | 1 0011 |
| 4 | 0 0100 |
| 5 | 1 0101 |
| 6 | 1 0110 |
| 7 | 0 0111 |
| 8 | 0 1000 |
| 9 | 1 1001 |
| A | 1 1010 |
| B | 0 1011 |
| C | 1 1100 |
| D | 0 1101 |
| E | 0 1110 |
| F | 1 1111 |

In some embodiments, each bit of the pattern may be represented by a tone pair. As a result, the parity bit and other bits may be represented by a high or low frequency tone. Table 2 illustrates an example of data being communicated, a binary pattern resulting from that data, and which frequencies are used (F1-F10) to communicate that data. Depending on the embodiment, the frequencies may be communicated at different times and/or concurrently.

TABLE 2

| Data | Pattern | F1 | F2 | F3 | F4 | F5 | F6 | F7 | F8 | F9 | F10 |
|------|---------|----|----|----|----|----|----|----|----|----|----|
| 0 | 1 0000 | | X | X | | X | | X | | X | |
| 1 | 0 0001 | X | | X | | X | | X | | | X |

TABLE 2-continued

| Data | Pattern | F1 | F2 | F3 | F4 | F5 | F6 | F7 | F8 | F9 | F10 |
|---|---|---|---|---|---|---|---|---|---|---|---|
| 2 | 0 0010 | X | | X | | X | | | X | X | |
| 3 | 1 0011 | | X | X | | X | | | X | | X |
| 4 | 0 0100 | X | | X | | | X | X | | X | |
| 5 | 1 0101 | | X | X | | | X | X | | | X |
| 6 | 1 0110 | | X | X | | | X | | | X | X |
| 7 | 0 0111 | X | | X | | | X | | | X | X | |
| 8 | 0 1000 | X | | | X | X | | X | | X | |
| 9 | 1 1001 | | X | | X | X | | X | | | X |
| A | 1 1010 | | X | | X | X | | | | X | X |
| B | 0 1011 | X | | | X | X | | | | X | X |
| C | 1 1100 | | X | | X | | X | X | | X | |
| D | 0 1101 | X | | | X | | X | X | | | X |
| E | 0 1110 | X | | | X | | X | | | X | X |
| F | 1 1111 | | X | | X | | X | | | X | X |

The parity bit may indicate an error in detecting a tone symbol. As a result, other error detection mechanisms may be utilized in conjunction with or in substitution for the parity bit. It should also be understood that a subset of frequencies may be utilized, depending on the data being communicated and the particular embodiment. As an example, Table 3 depicts frequencies to communicate digits 0-7 without parity.

TABLE 3

| Data | Pattern | F5 | F6 | F7 | F8 | F9 | F10 |
|---|---|---|---|---|---|---|---|
| 0 | 000 | X | | X | | X | |
| 1 | 001 | X | | X | | | X |
| 2 | 010 | X | | | X | X | |
| 3 | 011 | X | | | X | | X |
| 4 | 100 | | X | X | | X | |
| 5 | 101 | | X | X | | | X |
| 6 | 110 | | X | | X | X | |
| 7 | 111 | | X | | X | | X |

In some embodiments, the two largest tones may be detected and compared to signal patterns to decide if a tone symbol was detected. This operates sufficiently if there is minimal interference and at least some of the tone signaling energy is received without significant distortion. As these criteria are not often met, a tone detection system may be utilized with fast Fourier Transform (FFT) processing, Goertzel-Algorithm, and/or other processing mechanism. As an example, if tones are signaled in pairs of discrete frequencies F0, F1, F2, F3, F4, etc., the detection logic may utilize FFT to convert the received audio to the frequency domain. Utilizing a block of samples, "signal_in_time," the FFT converts the audio into "signal_in_frequency" that will include 1024 elements, with signal_in_frequency{i}storing the amplitude of the signal at a frequency of i*44100/1024, where i ranges from 0 to 1023. If each F[j] is picked so that F[j] is k*44100/1024 (a multiple of approximately 43 Hz), the frequency tones should line up with the FFT bins.

Additionally, assuming the system decides that a tone burst exists with the current processing block, the receiving device only needs to look at the energy at F0, F1, F2, etc. A decision may also be made regarding which tone burst was present during the current period. In one embodiment, each tone signal may include (F0 OR F1) AND (F2 OR F3), etc. In this way, the decision may be simplified by determining whether there is more energy in F0 or F1; in F2 or F3. Depending on the set of decisions, the detected signal may be the sum of decisions.

Referring now to the drawings, FIG. 1 depicts a first embodiment of a computing environment of a system 100 of utilizing tones, according to one or more embodiments shown and described herein. As illustrated, the computing environment may include a network 105, which may be a wide area network (wired or wireless), such as the internet, a cellular network, or other communications network for communicating devices across a wide area. Additionally or alternatively, the network 105 may be a wired or wireless local area network for communicating the data, such as via a local area network, near field communication (NFC), Bluetooth, wireless fidelity (WiFi). As such, while the network 105 is depicted as an intermediary between one or more devices, this is merely an example depiction. Depending on the particular embodiment, communication may be facilitated between or among devices without an intermediary.

Coupled to the network 105 is at least one computing device, such as a user computing device 102a, a mobile computing device 102b (the user computing device 102a and the mobile computing device 102b are collectively referred to herein as "the recipient computing device 102"), and a remote computing device 104. Also coupled to the network 105 is a presentation device 106. The user computing device 102a may be configured for a user to view, create, and/or perceive one or more tones that have been integrated into content. As discussed in more detail below, the user computing device 102a may additionally interface with the remote computing device 104 for performing this functionality.

Also included is the mobile computing device 102b, which is coupled to the network 105. The mobile computing device 102b may be operated by a consumer or other user and thus may be given different access to the remote computing device 104 than is the user computing device 102a. Accordingly, different login classifications may be granted for administrative users and consumer users. Depending on the embodiment, additional access levels may also be provided.

Also coupled to the network 105 is the presentation device 106. The presentation device 106 may include a radio, television, mobile device, and/or other device of receiving broadcast content and providing the content to the consumer or other user (such as via terrestrial radio, terrestrial television, satellite radio, satellite television, internet radio, internet television, etc.). The presentation device 106 may thus receive content from the remote computing device 104 for presentation to the consumer or other user. As will be understood, in some embodiments the presentation device 106 may be a standalone device, such as a television, radio, etc. However, in some embodiments, the presentation device 106 may be configured as an application or may otherwise be integrated into a computing device (such as the user computing device 102a and/or the mobile computing device 102b) or other hardware.

The remote computing device 104 may include a memory component 140 that stores tone logic 144a and data providing logic 144b. The tone logic 144a may include one or more components, such as for generating one or more tones and incorporating the one or more tones into content, such as audio content, video content, etc. The data providing logic 144b may be configured to cause the remote computing device 104 to provide the content data and the tone data to the mobile computing device 102b and/or the user computing device 102a. The data providing logic 144b may further cause the remote computing device 104 to communicate with the user computing device 102a and/or the mobile computing device 102b for creation and/or management of the tone data and content.

It should also be understood that while the remote computing device 104 is depicted as a standalone system in FIG. 1, this is also merely an embodiment. In some embodiments, the remote computing device 104 may be integrated with and/or may otherwise communicate with a radio station, television station, and/or other hardware for presenting the content and tone data to a plurality of consumers and/or devices. Accordingly, the remote computing device 104 may be configured for facilitating broadcast of the content via traditional AM, FM, XM radio stations, over-the-air television stations, internet stations, satellite television stations, etc.

Figure 2:
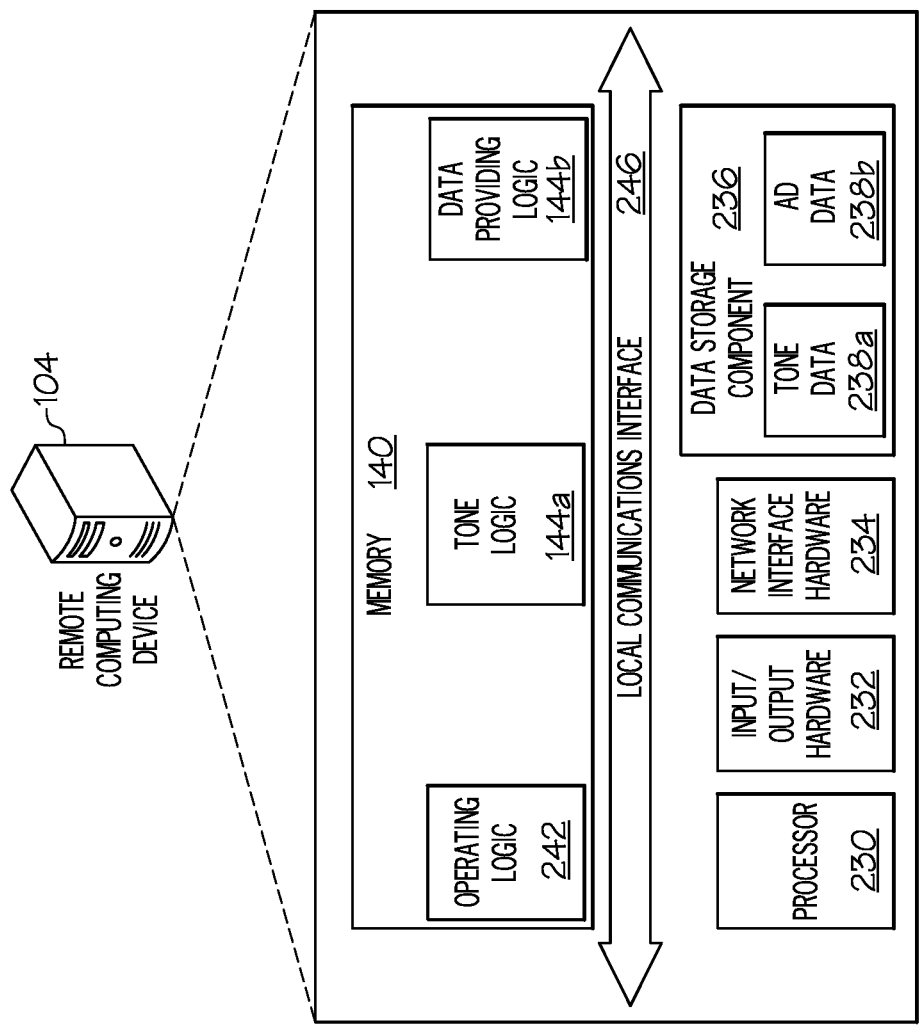
FIG. 2 depicts a block diagram of illustrative hardware components of the remote computing device for utilizing tones, according to one or more embodiments shown and described herein.

FIG. 2 depicts a block diagram of illustrative hardware components of the remote computing device 104 for utilizing tones, according to one or more embodiments shown and described herein. As illustrated, the remote computing device 104 includes a processor 230, input/output hardware 232, a network interface hardware 234, a data storage component 236 (which stores tone data 238a and/or advertisement data 238b), and a memory component 140. Each of the components of the tone-determining computing device 110 may be communicatively coupled to a local communications interface 246. The local communications interface 246 is generally not limited by the present disclosure and may be implemented as a bus or other communications interface to facilitate communication among the components of the computing environment of the system 100.

The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable medium. Depending on the particular embodiment, these non-transitory computer-readable mediums may reside within or outside the remote computing device 104 and/or external to the remote computing device 104.

The memory component 140 may store operating logic 242, the tone logic 144a, and the data providing logic 144b. Each of these logic components may include a plurality of different pieces of logic, each of which may be embodied as a computer program, firmware, and/or hardware, as an example. As an example, the operating logic 242 may include an operating system and/or other software for managing components of the remote computing device 104. As discussed above, the tone logic 144a may reside in the memory component 140 and may be configured to cause the processor 230 to receive commands from the user computing device 102a and/or the mobile computing device 102b to create, edit, and/or otherwise manage tone data and content. The data providing logic 144b may be configured to cause the processor 230 to provide the data to the presentation device 106, user computing device 102a, and/or mobile computing device 102b.

The processor 230 may include any processing component operable to receive and execute instructions (such as from a data storage component 236). Illustrative examples of the processor 230 include, but are not limited to, a computer processing unit (CPU), a many integrated core (MIC) processing device, an accelerated processing unit (APU), a digital signal processor (DSP). In some embodiments, the processor 230 may be a plurality of components that function together to provide processing capabilities, such as integrated circuits (including field programmable gate arrays (FPGA)) and the like.

As described above, the input/output hardware 232 may include and/or be configured to interface with the components of FIG. 2. For example, the input/output hardware 232 may be configured to interface with the presentation device 106 or with hardware that provides a user interface to a user for the purposes of adjusting settings, viewing a status, and/or the like.

The network interface hardware 234 may include and/or be configured for communicating with any wired or wireless networking hardware, including an antenna, a modem, a LAN port, wireless fidelity (Wi-Fi) card, WiMax card, ZigBee card, Bluetooth chip, USB card, mobile communications hardware, and/or other hardware for communicating with other networks and/or devices. From this connection, communication may be facilitated between the remote computing device 104 and other computing devices such as the user computing device 102a and the mobile computing device 102b.

The data storage component 236 may generally be any medium that stores digital data, such as, for example, a hard disk drive, a solid state drive (SSD), a compact disc (CD), a digital versatile disc (DVD), a Blu-Ray disc, and/or the like. It should be understood that the data storage component 236 may reside local to and/or remote from the remote computing device 104 and may be configured to store one or more pieces of data and selectively provide access to the one or more pieces of data.

It should be understood that while the components in FIG. 2 are illustrated as residing within the remote computing device 104, this is merely an example. In some embodiments, one or more of the components may reside external to the remote computing device 104 or within other devices, such as those depicted in FIG. 1. It should also be understood that, while the remote computing device 104 is illustrated as a single device, this is also merely an example. In some embodiments, the tone logic 144a and the data providing logic 144b may reside on different computing devices. As an example, one or more of the functionalities and/or components described herein may be provided by the user computing device 102a, the mobile computing device 102b, and/or the remote computing device 104. As an example, the user computing device 102a and/or the mobile computing device 102b may have similar components as those depicted in FIG. 2. To this end the user computing device 102a and/or the mobile computing device 102b may include logic for performing the functionality described herein.

Additionally, while the remote computing device 104 is illustrated with the tone logic 144a and the data providing logic 144b as separate logical components, this is also an example. In some embodiments, a single piece of logic may provide the described functionality. It should also be understood that while the tone logic 144a and the data providing logic 144b are described herein as the logical components, this is also an example. Other components may also be included, depending on the embodiment.

FIGS. 3A-3H depict user interfaces of a software application for creating and/or utilizing a project of embedding tones carrying a commercial message within a content, according to one or more embodiments described herein. As illustrated, FIG. 3A depicts a login interface for accessing a website. FIG. 3B depicts a welcome interface that includes a "Go To Downloads" option, an "Open Previous Project" option, a "Logout" option, and a "Start New Project" option. In response to selection of the "Start New Project" option, the user interface of FIG. 3C may be provided. The user interface of FIG. 3C includes a project title field for creating a user-defined title of the project. An associated project number will be automatically generated, assigned to and recorded as reference to this project. Also included are a media field, with an "Enter" option and a "Back" option. Specifically, the user may specify a location of a media file for which one or more tones may be included. The user may select a "Browse" option to locate the file. Regardless, once the user specifies the content, the user may select the "Enter" option. If the user desires to return to a previous user interface, the user may select the "Back" option.

In response to selection of the "Enter" option in FIG. 3C, the user interface of FIG. 3D may be provided. The user interface of FIG. 3D includes an "Auto" option and a "Manual" option. By selecting the "Auto" option, one or more tones may be automatically generated and placed in a first graphical section of FIG. 3D. If the user selects the "Manual" option, the user may specify the tone that is to be included with the content, as well as the location within that content that the tone will occur. As illustrated, a waveform of both the content and the tone may be depicted in the first graphical section. Also provided in FIG. 3D are a second tone option and a second graphical section. Specifically, the user may designate whether there are one or more tones being included with the content. If the user determines that there is more than one tone to be included with the content, the user may so designate in the second tone option. The user may then select a location of the second tone within the content. If a third tone (or more than three tones) is desired, options for including that tone may also be provided. When the user has completed designation and placement of the tone, the user may select a "Done" option. If the user wishes to return to a previous user interface, the user may select a "Back" option.

FIG. 3E depicts a user interface for the user to specify a message that the tone will instantiate. Upon the mobile computing device 102b (or other device) sensing play of the tone, the mobile computing device 102b may call an application or otherwise provide data to the user. The user interface of FIG. 3E may provide an option for the user to specify the data to be provided. Accordingly, the user interface of FIG. 3E provides a tone field for the user to specify logic, data, etc. for providing to the user upon detection of the tone. Also provided is an action option, which allows the user to specify whether to send the data (such as an offer) to the mobile computing device 102b immediately, send after a user defined number of hits, and/or to store the information in a database. A "Start" and "End" date option is also provided, as well as similar options for other tones that have been utilized with the content. A "Done" option and a "Back" option are also provided.

It should be understood that some embodiments may provide other options for providing the data to the user. As an example, some embodiments may provide an option to only provide the data to the user when located at a predetermined geo-location. Other options may be to provide certain types of data (or notification) at one location and another type of data (or notification) at another location. This might be implemented such that when the consumer is located in a grocery store, a visible notification is provided with first data, but when the consumer is in an automobile, an audio alert is provided with second data. Depending on the particular embodiment, the first data may be a coupon for purchasing a product and the second data may simply be an audio advertisement.

The user interface of FIG. 3F may be provided in response to selection of the "Done" option from FIG. 3E and indicates processing progress of the content. The user interface of FIG. 3G may be provided once the content has been processed and may provide a listing of downloads to be implemented. The user interface of FIG. 3G may include a project number field, a date field, a title field, and an international standardized commercial identifier (ISCI) field. A "Save As" option, a "Return To Main" option, and a "Logout" option are also provided. As will be understood, the user interface of FIG. 3G may also be reached in response to selection of the "Go To Downloads" option from FIG. 3B.

In response to selection of the Open Previous Project" option from FIG. 3B, the user interface of FIG. 3H may be provided. Similar to the user interface from FIG. 3G, the user interface of FIG. 3H includes a listing of project number, date, title, and ISCI code. The user may select one or more of the projects to view and/or edit details of the selected project. By doing so, the user may return to the user interface of FIG. 3D.

Figure 4:
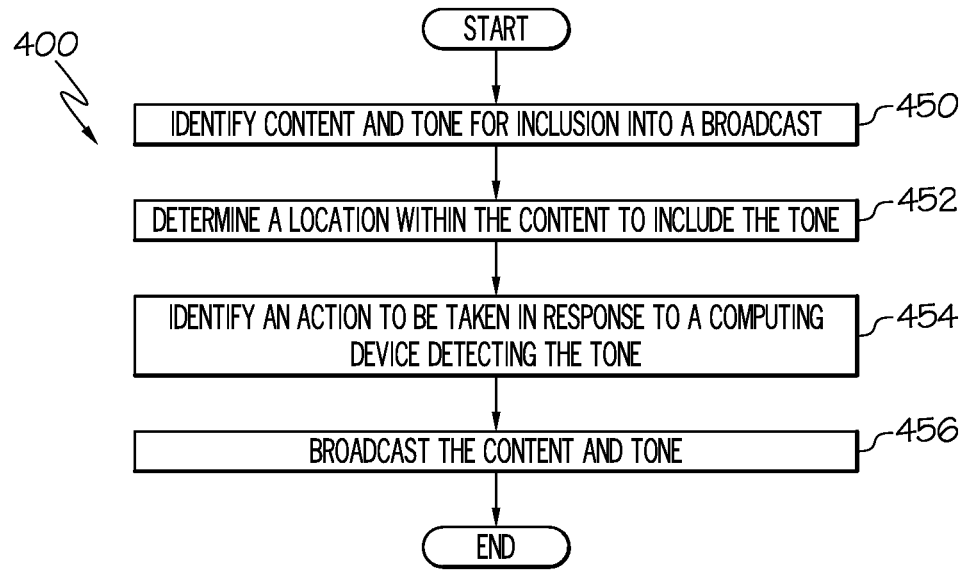
FIG. 4 depicts a block diagram for creating a tone for use in audio and/or video content, according to one or more embodiments described herein.

FIG. 4 depicts a block diagram for creating a tone for use in audio and/or video content, according to one or more embodiments described herein. As illustrated in block 450, content and a tone for inclusion into a broadcast are determined. Specifically, the content may include an internet radio broadcast (such as Pandora™, Spotify™ iHeartRadio™, etc.), a terrestrial radio broadcast (such as AM, FM, etc.), a satellite radio broadcast (such as XM™, Sirius™, etc.), internet video (such as Youtube.com™ Hulu.com™, Netflix.com™, etc.), terrestrial video (such as cable TV, satellite TV, over-the-air TV, etc.), and/or others. Additionally, a user may determine the data that will be included in the tone. As described above, the data may include an advertisement, information related to the content, information related to an environment in which the user is located, information related to the user, etc. Additionally, the embodiments may determine a coding scheme for converting the data into one or more tones. In block 452, a location within the content to include the tone may be determined. Specifically, the tone may be provided at the beginning of the content, at the end of the content, and/or during the content. As an example, if the content is a video and the video depicts a Coca-Cola™, the data may include information about Coca-Cola™, ways of purchasing the product, and/or other information, which may be provided concurrently with the image of the product. Similarly, if the content is a song, the data may include information about the artist, options for purchasing the song, etc. Once the data is converted into one or more tones, the tones may be broadcast with the content. Accordingly, a presentation device 106 may provide both the content and the data, which may be received by the user computing device 102a and/or mobile computing device 102b. In block 454, an action may be identified, where the action will be performed in response to a computing device detecting the tone. Specifically, the data may provide information related to the content, but may also include an action. The action may include an instruction for the recipient computing device 102 to launch a website, purchase a product, provide instructions for a user to find a product, etc. In block 456, the content and tone may be broadcast with the determined conditions.

Figure 5:
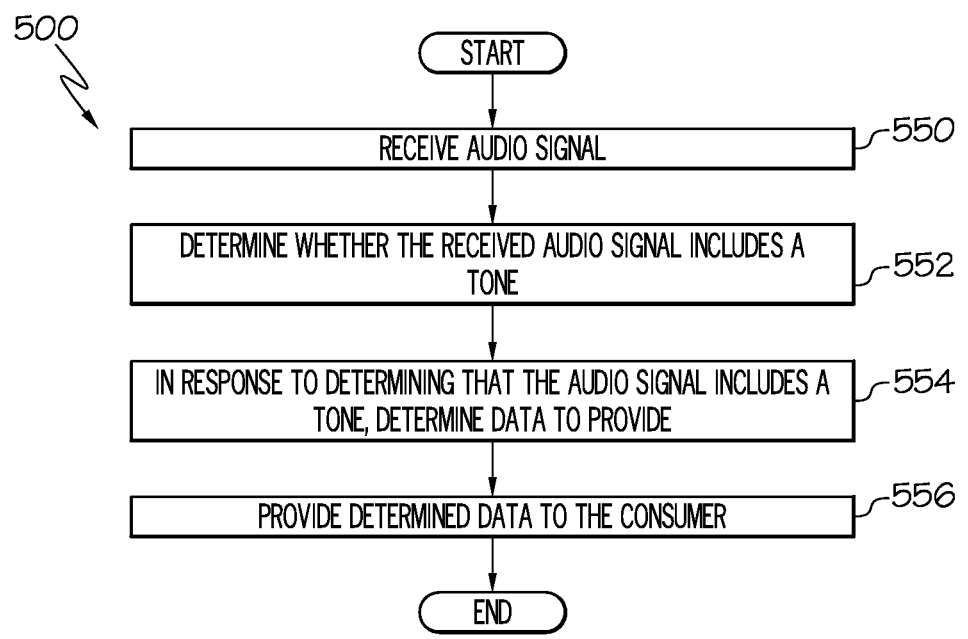
FIG. 5 depicts a block diagram for utilizing a tone in an audio and/or video content, according to one or more embodiments described herein.

FIG. 5 depicts a block diagram for utilizing a tone in an audio and/or video content, according to one or more embodiments described herein. In block 550, an audio signal may be received. As discussed above, the audio signal may include content and/or a tone. In block 552, a determination may be made regarding whether the received audio signal includes a tone. In block 554, in response to determining that the audio signal includes a tone, a determination may be made regarding data to provide. As discussed, this determination may be specified by the administrative user and may depend on the particular content, the location of the user, and/or other factors. As an example, recipient computing device 102 may determine that the data requests a website, an application, a widget, and/or other action to be taken on the recipient computing device 102. In block 556, the data may be provided to the consumer, based on the determined conditions. Accordingly, the website may be launched, and/or other actions may be taken.

Figure 6:
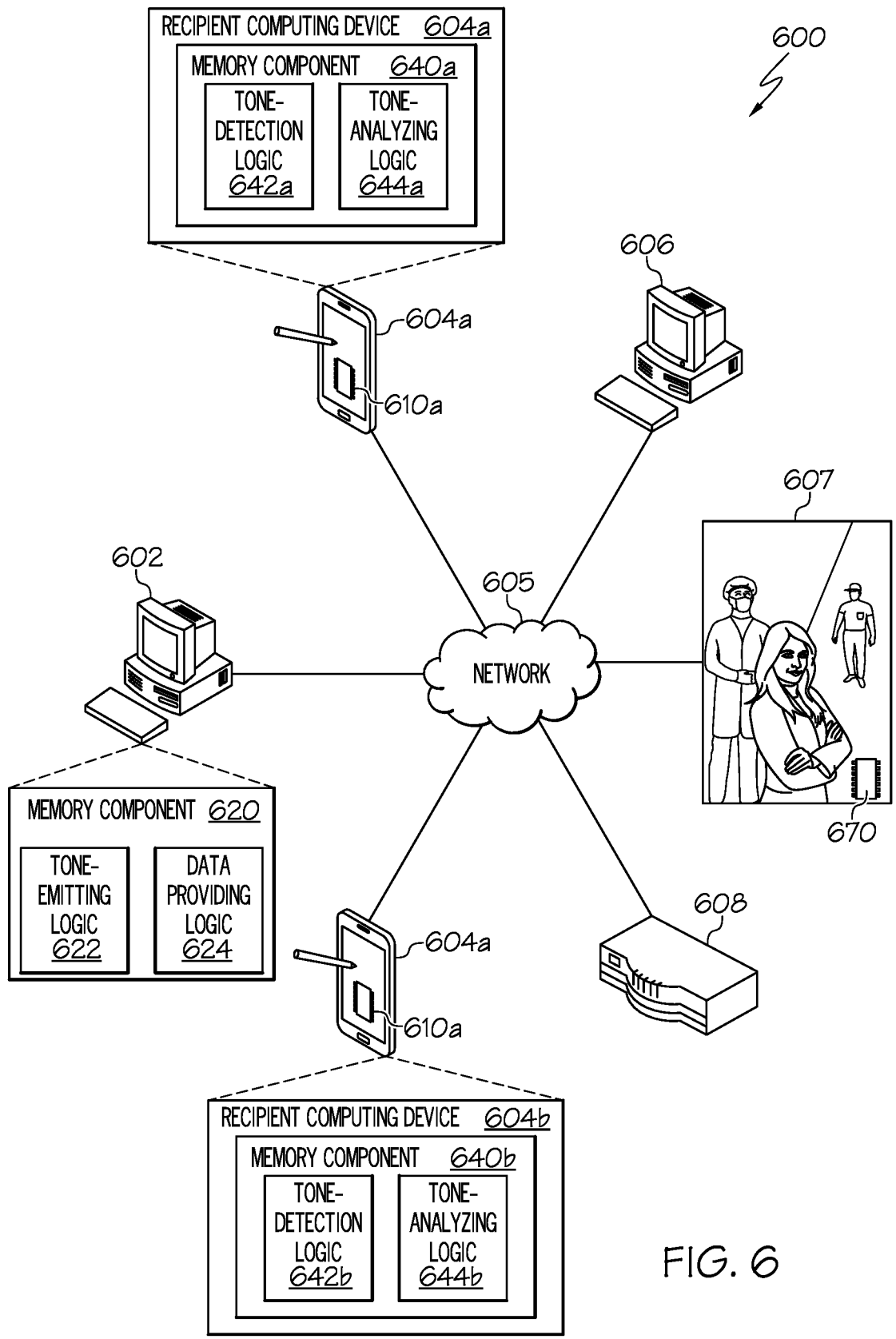
FIG. 6 depicts a second embodiment of a computing environment of a system of utilizing tones, according to one or more embodiments shown and described herein.

FIG. 6 depicts a second embodiment of a computing environment of a system 600 of utilizing tones, according to one or more embodiments shown and described herein. The system 600 includes a computing device 602, a first recipient computing device 604a, a second recipient computing device 604b, a remote computing device 606, an image 607 with a tone-transmitter 670 and a presentation device 608. As illustrated, the system 600 may include a network 605 substantially similar to the network 105 shown in FIG. 1. In a non-limiting example, the network 605 functions as an intermediary between one or more components of the system 600 in order to facilitate communication between or among the components.

The presentation device 608 is substantially similar to the presentation device 106 in FIG. 2. The presentation device 608 may be any device configured to receive and broadcast a presentation including content having an audio and/or video portion. In the embodiment shown in FIG. 6, the presentation device 608 is a movie projector configured to broadcast the content. In other embodiments, the presentation device 608 may be a television, virtual reality headset, mobile device, and/or other device with audio and/or video output hardware. In some embodiments, the presentation device 608 may be embodied as the computing device 602, the first recipient computing device 604a and the second recipient computing device 604b. The content may be a motion picture, a television broadcast, and/or a streaming broadcast.

The image 607 is communicatively coupled to the computing device 602 through the network 605. The image 607 may be two-dimensional or three-dimensional in nature. The image 607 includes a tone-transmitter 670 for transmitting a plurality of tones generated by the computing device 602, when the first recipient computing device 604a or the second recipient computing device 604b is placed within range. The plurality of tones can be detected by the first recipient computing device 604a and the second recipient computing device 604b to determine information related to the content.

The computing device 602 is substantially similar to the remote computing device 104 shown in FIG. 2. The computing device 602 includes a memory component 620 substantially similar to the memory component 140 of the remote computing device 104, except the memory component 620 includes tone-emitting logic 622, data providing logic 624 and/or other logic. The data providing logic 624 may be configured to cause the computing device 602 to receive content including a presentation with an audio portion and a video portion, receive data to be incorporated into the content and determine one or more locations within the content for embedding the data. The tone-emitting logic 622 may be configured to convert the data into a plurality of tones, incorporate the plurality of tones into the content at the one or more locations and provide the content with the plurality of tones for broadcast to the presentation device 608. In some embodiments, the tone-emitting logic 622 may send the plurality of tones directly to the tone-transmitter 670 in the image 607. In some embodiments, content with the plurality of tones may be directly sent to the first recipient computing device 604a, the second recipient computing device 604b and/or the remote computing device 606.

The remote computing device 606 may be any computing device having a designated function such as, but not limited to, viewing, creating, and/or perceiving the plurality of tones embedded into the content. The remote computing device 606 may be configured to communicate with the components of the system 600 through the network 605. In some embodiments, the remote computing device 606 may be a broadcast computing device configured to incorporate the plurality of tones during broadcast of the content. In other embodiments, the remote computing device 606 may be a production computing device configured to incorporate the plurality of tones during production of the content. In some other embodiments, the remote computing device 606 may be a post-production computing device configured to incorporate the plurality of tones during post-production processing of the content. In yet other embodiments, the remote computing device 606 may be a user computing device configured to monitor and log information into a database, wherein the information relates to incorporation of the plurality of tones, detection of the plurality of tones, physical location of the different components of the system 600 and various metadata associated with the broadcast of the content and detection of the plurality of tones embedded therein.

The first recipient computing device 604a and the second recipient computing device 604b are substantially similar to the mobile computing device 102b shown in FIG. 2. In some embodiments the first recipient computing device 604a and the second recipient computing device 604b may be a mobile communication device or a tablet, as depicted in FIG. 6. The first recipient computing device 604a and the second recipient computing device 604b have a first software application 610a and a second software application 610b installed thereon respectively.

The first recipient computing device 604a includes a memory component 640a substantially similar to the memory component 140 of the remote computing device 104, except the memory component 640a includes tone-detection logic 642a and tone-analyzing logic 644a. The second recipient computing device 604b includes a memory component 640b substantially similar to the memory component 140 of the remote computing device 104, except the memory component 640b includes tone-detection logic 642b and tone-analyzing logic 644b. The tone-detection logic 642a, 642b may be configured to receive content embedded with a plurality of tones sent by the computing device 602, the remote computing device 606, the image 607 or broadcast by the presentation device 608. The tone-detection logic 642a, 642b may be further configured to detect presence of the plurality of tones incorporated in the content. The tone-analyzing logic 644a, 644b may be configured to extract and determine information incorporated in the plurality of tones. The information determined by the tone-analyzing logic 644a, 644b may be available to the user through the software applications 610a, 610b installed on the recipient computing devices 604a, 604b.

In some embodiments, the information incorporated in the plurality of tones may be a first message for commercial purposes and a second message for anti-piracy monitoring purposes. For example, the first message may be an instruction related to open a website, to launch an application, to launch a widget, to open a pre-addressed and prewritten message, to deliver a coupon, to deliver a graphic advertisement, to open a video, to open a video game, to order an e-commerce item such as products associated with the content, coupons related to the broadcast data, and the like. The second message may include information regarding ownership of the content and the location of the presentation device 608 to help determine whether the content has been pirated, from where the content was pirated, or when the content was pirated.

In some embodiments, the first recipient computing device 604a may determine the first message but not the second message, while the second recipient computing device 604b may determine both the first message and the second message. The first software application 610a installed on the first recipient computing device 604a may generate the first message and may also be installed on the second recipient computing device 604b. However, the second software application 610b may require special permission or access and can only be installed on the second recipient computing device 604b. The second software application 610b may generate the second message for users who are approved to install the second software application 610b.

FIGS. 7A-7H depict user interfaces of a software application 630 used in the computing device 602 for creating and/or utilizing a project of embedding tones carrying an anti-piracy monitoring message within content. As illustrated in FIG. 7A, a user may login to begin. The user interface of FIG. 7B provides a view downloads option, an open previous option, a new project option, and a logout option. In response to selection of the new project option, the user interface of FIG. 7C may be provided. The user interface of FIG. 7C provides a title field for a user to provide a title of the new project. Also provided are upload options for locating and uploading content into which tones may be inserted.

In FIG. 7D, the tone frequencies may be determined and/or selected. In FIG. 7E, options related to the message being included in the content may be provided. As illustrated, the user may create, locate, upload, and/or otherwise provide the message for converting into one or more tones. In addition, options for a recipient device to perform actions may also be included in the tones. As an example, the user interface of FIG. 7E provides options for including commands such as determine the projector location. As such, when a recipient device receives the tones, it will automatically determine its location (and thus the projector location). If the tones also indicate the authorized location, the recipient device may compare these pieces of data to determine whether the content is properly being displayed. Other options for commands include determining the owner of the content and storing information in a database (e.g., once the location is determined, the recipient device sends the data to a remote database for storage and processing. Options for specifying active dates are also provided. As an example, if the recipient device receives tones that indicate that the active date has passed, it may take different actions (or no action at all) because the data may not be applicable. Once complete, the user interface of 7F may be provided indicating that the actions are being performed.

It should be understood that, with regard to FIGS. 7D and 7E, some embodiments are configured for a user to manually determine the tone frequencies and the location of the one or more tones within the content. However, some embodiments may be configured for the computing device 602 to scan the content audio and determine one or more sections of the audio that would be good candidates for inserting tones. As an example, these embodiments may search for volume (e.g., high volume, such as an explosion), frequency (e.g., frequencies where the tone would be masked but not interfere with the audio), time period (e.g., a predetermined portion from the beginning or end of the content), etc. Once the candidates are identified, the computing device 602 may determine the tone frequencies that will be used. The tone frequencies may be selected based on the data being communicated and/or based on the frequencies in the content.

Referring back to FIG. 7B, if the user selects the downloads option, the user interface of FIG. 7G may be provided to show previous downloads. In response to selection of the previous projects option, the user interface of FIG. 7H may be provided.

Figure 8B:
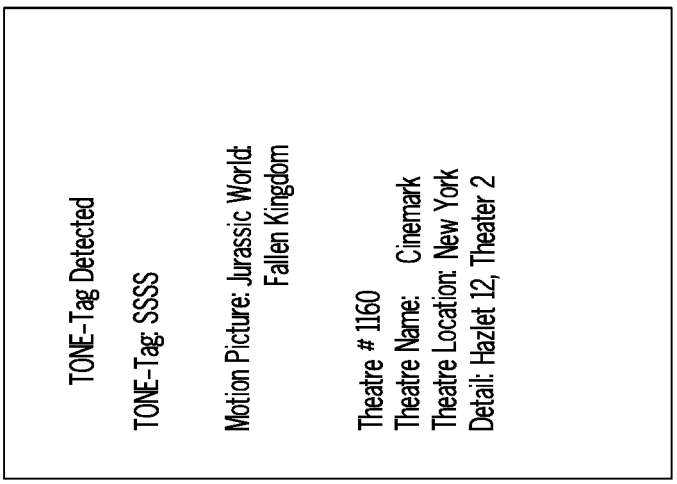
FIGS. 8A-8B depicts user interfaces of a software application in a recipient computing device used for anti-piracy monitoring, according to one or more embodiments shown and described herein.
Figure 8A:
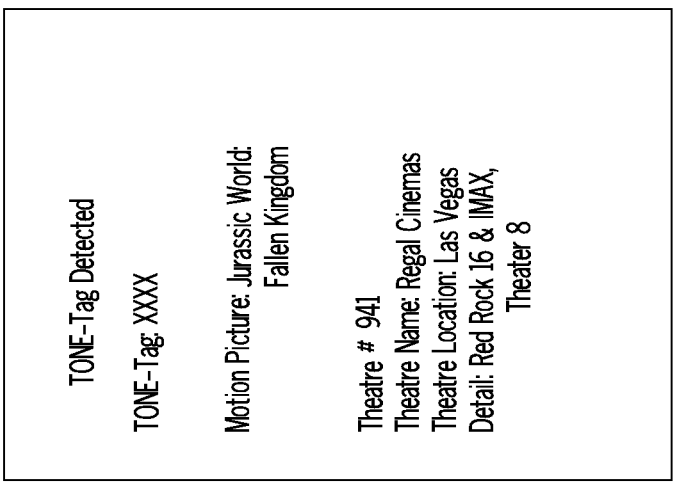

FIGS. 8A-8B depict example user interfaces of the software application 610b installed on the second recipient computing device 604b and used for anti-piracy monitoring. The example user interfaces in FIGS. 8A-8B show the information contained in the plurality of tones detected by the second recipient computing device 604b. The information includes the name of the movie, the location and name of the theater from where the movie was pirated and the specific movie projector that broadcasted the movie. In some embodiments, the information may further include name of the owner or presenter of the movie and the time and date of broadcast of the movie.

In operation, the system 600 can be used advantageously for utilizing tones within broadcast content for anti-piracy monitoring as well as engaging with consumers. The computing device 602 receives a movie having at least an audio portion. In different embodiments, the content may also be a television broadcast, or a streaming broadcast. The movie is configured to be broadcast by the presentation device 608, which may be a movie projector, a television, or any other computing device such as the first recipient computing device 604a and the second recipient computing device 604b. A first plurality of users having the first type of recipient computing device 604a and a second plurality of users having the second type of recipient computing device 604b may receive the broadcasted movie for viewing. The first plurality of users may be movie-goers and the second plurality of users may be movie producers. The computing device 602 also receives data comprising a first message and a second message. The first message includes information for commercial purposes and is intended for the first plurality of users. For example, the first message may contain a graphic advertisement about an offer from the movie producer or the theater owner. The second message includes information for anti-piracy monitoring purposes and is intended for the second plurality of users. For example, the second message may contain an authentication certificate identifying ownership of the movie and the location of the presentation device 608.

The computing device 602 then determines one or more locations within the movie for embedding the first message and the second message. The selected locations may include a first location at a predetermined time after a beginning of the movie, a second location at a predetermined time before an end of the movie. Additionally, a third location may be selected around a middle portion of the movie, where the audio frequency matches the frequency of the plurality of tones subsequently selected, and a fourth location may be around a portion of the movie that includes an audio volume that far exceeds the volume of the plurality of tones. A variety of locations can be strategically selected such that the plurality of tones placed within the movie cannot be detected by the human ear and as a result would not be perceived by the first plurality of users and the second plurality of users during broadcast of the movie.

The computing device 602 converts at least the first message and the second message into a plurality of tones. In some embodiments, the computing device 602 selects sounds for the plurality of tones such that they correspond to at least one pair of non-naturally occurring frequencies in a range between about 15 kHz and about 25 kHz. In other embodiments, the computing device 602 determines a frequency at one or more locations within the movie and then selects sounds corresponding to at least one pair of non-naturally occurring equal to or greater than the frequencies at the one or more locations within the movie. All frequency pairs are optimized to prevent intermodulation. The computing device 602 assigns the sounds corresponding to the at least one pair of non-naturally occurring frequencies a unique character and then arranges the sounds to form the plurality of tones comprising a sequence of the unique characters representing the first message and the second message.

In some embodiments, the computing device 602 incorporates the plurality of tones into the movie at the one or more locations during post-production processing of the movie. However, in other embodiments, the plurality of tones may be incorporated into the movie during production of the movie or during broadcast of the movie, for example. In some embodiments, the computing device 602 incorporates the plurality of tones in the movie. In other embodiments, the computing device 602 may transmit the plurality of tones to the remote computing device 606 for incorporating the plurality of tones in the movie. The movie with the plurality of tones embedded therein is then provided to the presentation device 608 for broadcast to the first plurality of users and the second plurality of users. In some embodiments, only the plurality of tones containing either the first message or a third message having commercial information related to the movie are sent to the image 607, which is a movie poster. The plurality of tones sent to the image 607 and transmitting by the tone-transmitter 670 also cannot be directly detected by the human ear.

During broadcast of the movie, the plurality of tones is detected by the first recipient computing device 604a and the second recipient computing device 604b. The plurality of tones transmitted by the tone-transmitter 670 in the image 607 can also be detected by the first recipient computing device 604a and the second recipient computing device 604b when they are within a certain range of the image 607. The first software application 610a installed on the first recipient computing device 604a as well as the second recipient computing device 604b decodes the first message for the first plurality of users, the movie-goers as well as the second plurality of users, the movie producers. The second software application 610b is only approved to be installed on the second recipient computing device 604b and can determine the second message only for the second plurality of users, the movie producers. Accordingly, the movie producers are able to determine the ownership of the movie and the location of the presentation device 608 that broadcasted the movie. In some embodiments, the second software application may additionally, after determining the second message, compare the location of the presentation device 608 as determined by the data in the tone with a location of the second recipient computing device 604b to determine whether the movie has been pirated, from where the movie was pirated, or when the movie was pirated.

Figure 9:
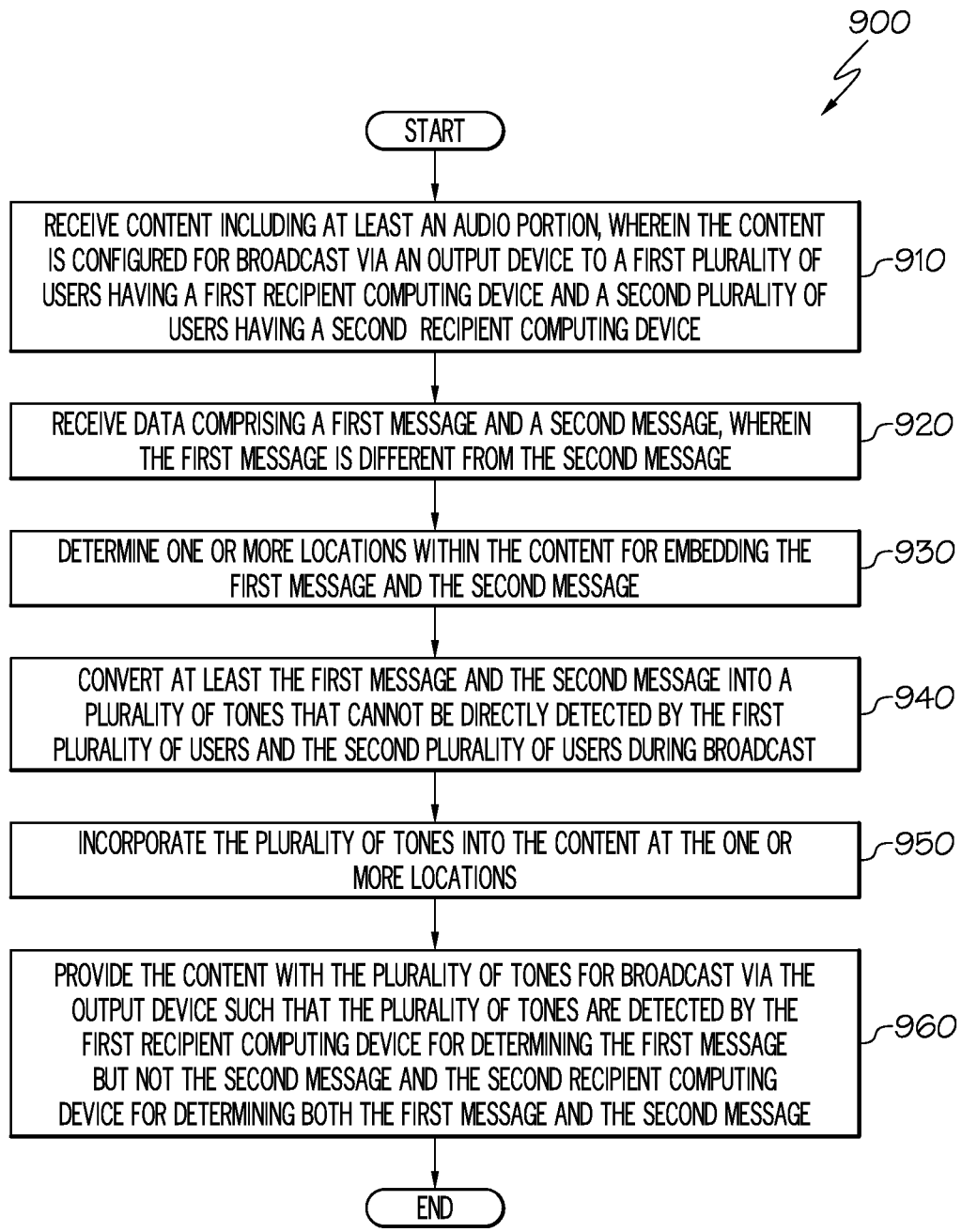
FIG. 9 depicts a block diagram for a method of utilizing tones to convey one or more messages, according to embodiments described herein.

FIG. 9 depicts a block diagram for a method of utilizing tones to convey one or more messages, according to embodiments described herein. In block 910, a computing device receives content including at least an audio portion. In some embodiments, the content may further include a video portion. The content is configured for broadcast via a presentation device to a first plurality of users having a first recipient computing device and a second plurality of users having a second recipient computing device. In block 920, the computing device further receives data comprising a first message and a second message, wherein the first message is different from the second message. The first message identifies at least one of the following: ownership of the content, broadcast data, products associated with the content, coupons related to the broadcast data, or information regarding the content. The second message also identifies at least one of the following: ownership of the content, broadcast data, products associated with the content, coupons related to the broadcast data, or information regarding the content.

In block 930, the computing device determines one or more locations within the content for embedding the first message and the second message. The one or more locations may include a first location at a predetermined time after a beginning of the content, a second location at a predetermined time before an end of the content, a third location around a middle portion of the content that includes an audio segment having a frequency of the plurality of tones, or a fourth location around a portion of the content that includes an audio segment having a predetermined volume.

In block 940, the computing device converts at least the first message and the second message into a plurality of tones that cannot be directly detected by the first plurality of users and the second plurality of users during broadcast. In block 950, the computing device incorporates the plurality of tones into the content at the one or more locations. The plurality of tones may be incorporated into the content during production of the content, during post-production processing of the content, or during broadcast of the content.

In block 960, the computing device provides the content with the plurality of tones for broadcast via the presentation device. The plurality of tones is detected by the first recipient computing device and the second recipient device for determining at least one of the first message and the second message. In some embodiments, a first application in the first recipient computing device determines the first message but not the second message, while a second application in the second recipient computing device determines both the first message and the second message. In some embodiments, the second message identifies broadcast data which includes location of the presentation device. The second application then receives the second message, determines the second message and compares the location identified in the tone with a location of the second recipient computing device to determine at least one of the following: whether the content has been pirated, from where the content was pirated, or when the content was pirated.

Figure 10:
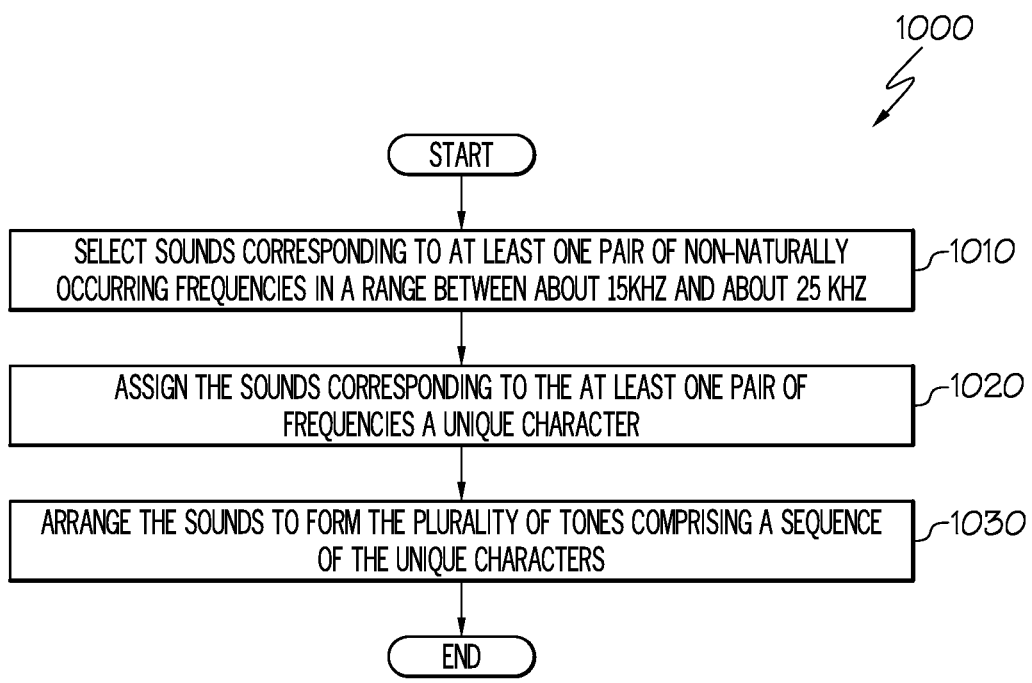
FIG. 10 depicts a block diagram for a method of incorporating a plurality of tones having a definite frequency range into the content, according to embodiments described herein.

FIG. 10 depicts a block diagram for a method 1000 of incorporating a plurality of tones having a definite frequency range into the content, according to embodiments described herein. In block 1010, a computing device selects sounds corresponding to at least one pair of non-naturally occurring frequencies in a range between about 15 kHz and about 25 kHz. All frequency pairs are optimized to prevent intermodulation. In block 1020, the computing device assigns the sounds corresponding to the at least one pair of frequencies a unique character. In block 1030, the computing device arranges the sounds to form the plurality of tones comprising a sequence of the unique characters.

Figure 11:
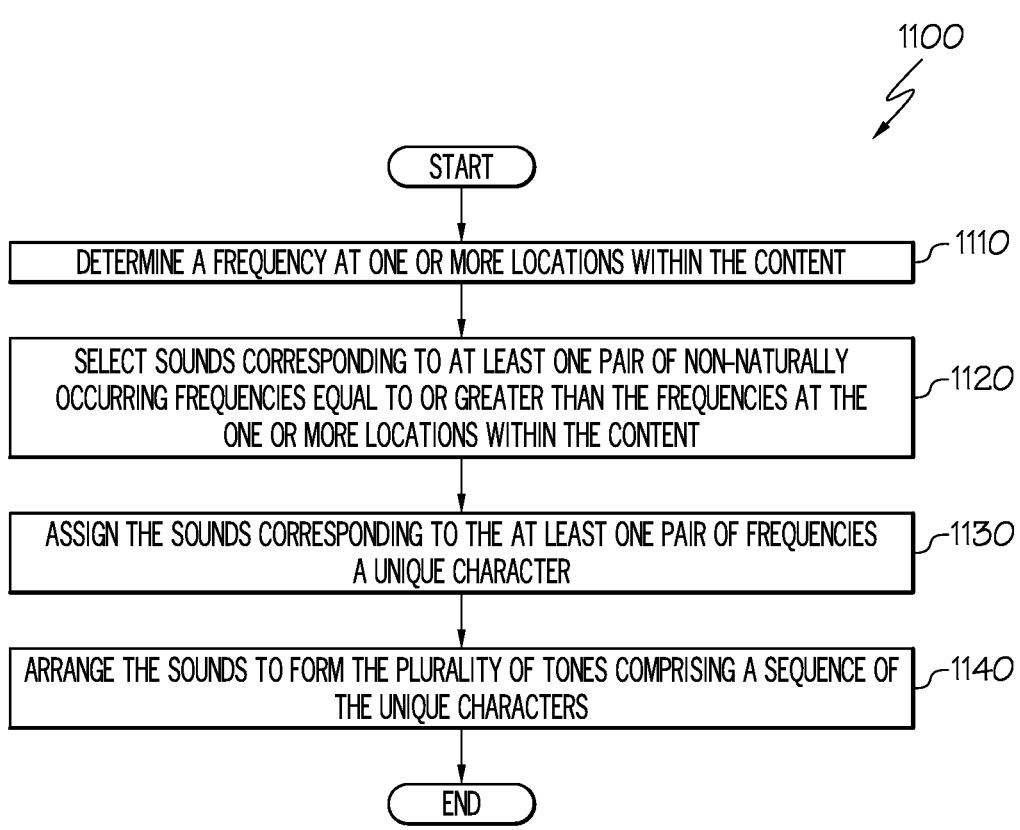
FIG. 11 depicts a block diagram for a method of incorporating a plurality of tones into the content based on frequency of the content, according to embodiments described herein.

FIG. 11 depicts a block diagram for a method 1100 of incorporating a plurality of tones into the content based on frequency of the content, according to embodiments described herein. In block 1110, a computing device determines a frequency at one or more locations within the content. In block 1110, the computing device selects sounds corresponding to at least one pair of non-naturally occurring equal to or greater than the frequencies at the one or more locations within the content. All frequency pairs are optimized to prevent intermodulation. In block 1120, the computing device assigns the sounds corresponding to the at least one pair of frequencies a unique character. In block 1130, the computing device arranges the sounds to form the plurality of tones comprising a sequence of the unique characters.

The systems and methods of utilizing tones within broadcast content for anti-piracy monitoring as well as providing commercial information to consumers. The systems and methods can be advantageously used to incorporate a plurality of tones over a song, audio stream or a movie such that the plurality of tones can be detected using a software application to determine the information contained in the plurality of tones. In one embodiment, a software application approved to be installed on the mobile computing device of an owner of copyrighted content can be used to uniquely identify the content and whether and how it was pirated. As an example, a software application designed for producers of a movie can be used anytime by the movie producers when they come across a version of their film on a DVD or on a website to determine whether and how the copy was pirated. When the movie producer views a suspect version of the movie, the software application installed on the movie producer's mobile device will authenticate the print of the movie by displaying the copy identification number, the name of the exhibitor showing the content and the exact date, time and location where the movie was pirated. The system and methods thus enable the movie producer to enforce policing of theaters, especially those that are more vulnerable to piracy as well as to prove responsibility and liability for piracy.

In another embodiment, a software application installed, without requiring any special approval, on the mobile computing device of a consumer can be used to deliver graphic advertisements and offers related to content of interest to the consumer. The delivery of such commercial information may occur through AM/FM Radio Broadcast, TV Broadcast, pre-show advertising inside movie theaters as well as via ambient music played in a retail environment.

It should now be understood that embodiments disclosed herein include systems and methods for communicating information utilizing tones. These embodiments provide significantly more than what is common in the technology in that a plurality of tones are utilized to provide functionality that has not been provided in the art. As an example, embodiments described herein provide authentication of copyrighted content and transmission of commercial information that was previously unavailable. Embodiments also provide communication among a plurality of devices for sharing data, authenticating access to data, and the like. It should also be understood that these embodiments are merely exemplary and are not intended to limit the scope of this disclosure.

It is noted that the terms "substantially" and "about" may be utilized herein to include the inherent degree of uncertainty that may be attributed to any quantitative comparison, value, measurement, or other representation. These terms are also utilized herein to represent the degree by which a quantitative representation may vary from a stated reference without resulting in a change in the basic function and intended scope of the subject matter at issue.

While particular embodiments and aspects of the present disclosure have been illustrated and described herein, various other changes and modifications can be made without departing from the spirit and scope of the claimed subject matter. Moreover, although various aspects of the claimed subject matter have been described herein, such aspects need not be utilized in combination. Accordingly, it is therefore intended that the appended claims cover all such changes and modifications that are within the scope of the embodiments shown and described herein.

What is claimed is:

1. A method comprising:
   receiving, by a computing device, content including at least an audio portion, wherein the content is configured for broadcast via a presentation device to a first plurality of users having a first recipient computing device and a second plurality of users having a second recipient computing device;
   receiving, by the computing device, data comprising a first message and a second message, wherein the first message is different from the second message;
   determining, by the computing device, one or more locations within the content for embedding the first message and the second message;
   converting, by the computing device, at least the first message and the second message into a plurality of tones that cannot be directly detected by the first plurality of users and the second plurality of users during broadcast, wherein converting at least the first message and the second message into the plurality of tones further comprises: selecting sounds corresponding to at least one pair of non-naturally occurring frequencies in a range between about 15 kHz and about 25 kHz; assigning the sounds corresponding to the at least one pair of non-naturally occurring frequencies a unique character; and arranging the sounds to form the plurality of tones comprising a sequence of the unique characters
   incorporating, by the computing device, the plurality of tones into the content at the one or more locations;
   receiving at least one of a plurality of options specify a timing mechanism for the presentation device to broadcast an instruction with the content, wherein the plurality of options include:
      a first option for the user to specify whether the instruction is to be executed immediately with the content,
      a second option for the user to specify whether the instruction is to be executed after a user-defined number of times that the plurality of tones are received by the recipient computing device, and
      a third user option to store the instruction with the content in a database; and
   providing the instruction according to the timing mechanism and the content with the plurality of tones for broadcast via the presentation device such that the plurality of tones are detected by the first recipient computing device and the second recipient device for determining at least one of the first message and the second message.

2. The method of claim 1, wherein converting at least the first message and the second message into the plurality of tones further comprises:
   determining a frequency at the one or more locations within the content;

selecting sounds corresponding to at least one pair of non-naturally occurring frequencies equal to or greater than the frequencies at the one or more locations within the content;

assigning the sounds corresponding to the at least one pair of non-naturally occurring frequencies a unique character; and arranging the sounds to form the plurality of tones comprising a sequence of the unique characters.

3. The method of claim 1, wherein the content further includes a video portion.

4. The method of claim 1, wherein the plurality of tones is incorporated during at least one of the following: during production of the content, during post-production processing of the content, or during broadcast of the content.

5. The method of claim 1, wherein the one or more locations includes at least one of the following: a first location at a predetermined time after a beginning of the content, a second location at a predetermined time before an end of the content, a third location around a middle portion of the content that includes an audio segment having a frequency of the plurality of tones, or a fourth location around a portion of the content that includes an audio segment having a predetermined volume.

6. The method of claim 1, wherein:
the first message identifies at least one of the following: ownership of the content, broadcast data, products associated with the content, coupons related to the broadcast data, or information regarding the content;
the second message identifies at least one of the following: ownership of the content, broadcast data, products associated with the content, coupons related to the broadcast data, or information regarding the content;
a first software application in the first recipient computing device determines the first message but not the second message; and
a second software application in the second recipient computing device determines both the first message and the second message.

7. The method of claim 6, wherein:
the second message identifies broadcast data;
the broadcast data includes location of the presentation device; and
the second software application receives the second message, determines the second message and compares the location of the presentation device with a location of the second recipient computing device to determine at least one of the following: whether the content has been pirated, from where the content was pirated, or when the content was pirated.

8. A system comprising:
a presentation device for broadcasting content; and
a computing device communicatively coupled to the presentation device, the computing device including a first processor and a first non-transitory computer-readable medium that stores logic that, when executed by the first processor, causes the system to perform at least the following:
receive content including a presentation with an audio portion and a video portion, wherein the content is configured for broadcast via the presentation device to a plurality of users having a recipient computing device;
receive data comprising a first message and a second message, wherein the first message is different from the second message;
determine one or more locations within the content for embedding the first message and one or more locations for embedding the second message;
convert at least the first message and the second message into a plurality of tones that cannot be directly detected by the plurality of users during broadcast, wherein converting at least the first message and the second message into the plurality of tones further comprises:
selecting sounds corresponding to at least one pair of non-naturally occurring frequencies in a range between about 15 kHz and about 25 kHz; assigning the sounds corresponding to the at least one pair of non-naturally occurring frequencies a unique character; and arranging the sounds to form the plurality of tones comprising a sequence of the unique characters
incorporate the plurality of tones into the content at the one or more locations;
receiving at least one of a plurality of options specify a timing mechanism for the presentation device to broadcast an instruction with the content, wherein the plurality of options include:
a first option for the user to specify whether the instruction is to be executed immediately with the content,
a second option for the user to specify whether the instruction is to be executed after a user-defined number of times that the plurality of tones are received by the recipient computing device, and
a third user option to store the instruction with the content in a database; and
provide the instruction according to the timing mechanism and the content with the plurality of tones for broadcast via the presentation device such that at least a portion of the plurality of tones are detected by the recipient computing device for determining at least one of the first message and the second message to authenticate ownership of the content and a location of the presentation device.

9. The system of claim 8, wherein the first non-transitory computer-readable medium stores logic that, when executed by the first processor, causes the system to convert at least the first message and the second message into a plurality of tones by:
determining a frequency at the one or more locations within the content;
selecting sounds corresponding to at least one pair of non-naturally occurring frequencies equal to or greater than the frequencies at the one or more locations within the content;
assigning the sounds corresponding to the at least one pair of non-naturally occurring frequencies a unique character; and
arranging the sounds to form the plurality of tones that includes a sequence of the unique characters.

10. The system of claim 8, wherein the one or more locations includes at least one of the following: around a beginning of the content, around an end of the content, and during the content.

11. The system of claim 8 further comprising at least one of:
a broadcast computing device for incorporating the plurality of tones during broadcast of the content;
a production computing device for incorporating the plurality of tones during production of the content; and
a post-production computing device for incorporating the plurality of tones during post-production processing of the content.

12. The system of claim 8 further comprising:
a recipient computing device that includes a second processor and a second non-transitory computer-readable medium that stores logic that, when executed by the second processor, causes the recipient computing device to perform at least the following:
receive the content;
detect presence of the plurality of tones incorporated in the content;
in response to determining the presence of the plurality of tones, determine at least one of the first message and the second message from the plurality of tones; and
determine ownership of the content and the location of the presentation device.

13. The system of claim 8 further comprising:
an image communicatively coupled to the computing device and comprising a tone-transmitter for transmitting a plurality of tones generated by the first computing device, the plurality of tones representing a third message that cannot be directly detected by the plurality of users but can be detected by the recipient computing device to determine commercial information related to the content.

14. A computing device comprising:
a first processor and a first non-transitory computer-readable medium that stores logic that, when executed by the first processor, causes the computing device to perform at least the following:
receive content including a presentation with an audio portion and a video portion, wherein the content is configured for broadcast via a presentation device to a plurality of users having a recipient computing device;
receive data comprising a message, wherein the message includes ownership of the content and location of the presentation device;
determine a location within the content for embedding the message;
convert at least a portion of the message into a plurality of tones that cannot be directly detected by the plurality of users during broadcast, wherein converting at least the first message and the second message into the plurality of tones further comprises: selecting sounds corresponding to at least one pair of non-naturally occurring frequencies in a range between about 15 kHz and about 25 kHz; assigning the sounds corresponding to the at least one pair of non-naturally occurring frequencies a unique character; and arranging the sounds to form the plurality of tones comprising a sequence of the unique characters
incorporate the plurality of tones into the content at the location;
receiving at least one of a plurality of options specify a timing mechanism for the presentation device to broadcast an instruction with the content, wherein the plurality of options include:

a first option for the user to specify whether the instruction is to be executed immediately with the content,
a second option for the user to specify whether the instruction is to be executed after a user-defined number of times that the plurality of tones are received by the recipient computing device, and
a third user option to store the instruction with the content in a database; and
provide the instruction according to the timing mechanism and the content with the plurality of tones for broadcast via the presentation device such that the plurality of tones are detected by the recipient computing device for determining the message to authenticate ownership of the content and location of the presentation device.

15. The computing device of claim 14, wherein the first non-transitory computer-readable medium stores logic that, when executed by the first processor, causes the system to convert the message into a plurality of tones by:
determining a frequency at the one or more locations within the content;
selecting sounds corresponding to at least one pair of non-naturally occurring frequencies equal to or greater than the frequencies at the one or more locations within the content;
assigning the sounds corresponding to the at least one pair of non-naturally occurring frequencies a unique character; and
arranging the sounds to form the plurality of tones comprising a sequence of the unique characters to represent at least a portion of the message.

16. The computing device of claim 14, wherein:
the location includes at least one of the following: a first location at a predetermined time after a beginning of the content, a second location at a predetermined time before an end of the content, a third location around a portion of the content that includes an audio segment having a frequency of the plurality of tones, or a fourth location around a portion of the content that includes an audio segment having a predetermined volume;
the content includes at least one of the following: a motion picture, a television broadcast, or a streaming broadcast; and
the presentation device is at least one of the following: a movie projector, a television, the computing device, or the recipient computing device.

17. The computing device of claim 14, wherein the plurality of tones is incorporated during at least one of the following: during production of the content, during post-production processing of the content, or during broadcast of the content.

* * * * *